Figure 1:
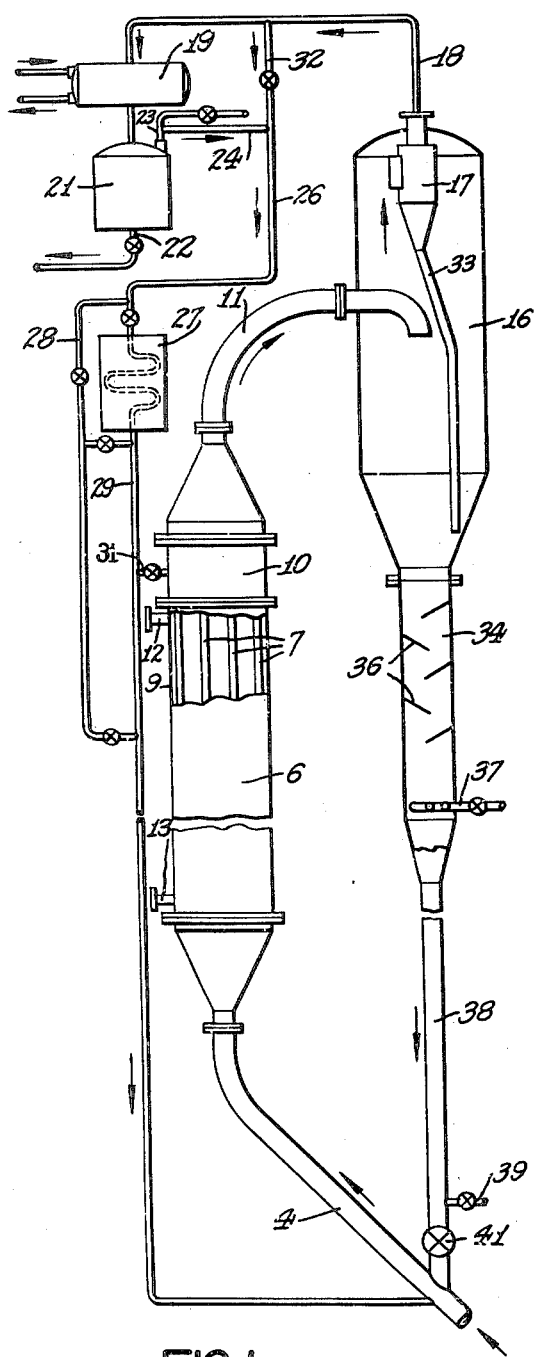

Sept. 6, 1949.  N. L. DICKINSON  2,481,089
PROCESS AND APPARATUS FOR THE SYNTHESIS
OF ORGANIC COMPOUNDS
Filed March 6, 1947

INVENTOR.
NORMAN L. DICKINSON
BY E. F. Liebrecht
Cruzan Alexander
ATTORNEYS

Patented Sept. 6, 1949

2,481,089

UNITED STATES PATENT OFFICE 2,481,089

PROCESS AND APPARATUS FOR THE SYNTHESIS OF ORGANIC COMPOUNDS

Norman L. Dickinson, Basking Ridge, N. J., assignor to The M. K. Kellogg Company, Jersey City, N. J., a corporation of Delaware Application March 6, 1947, Serial No. 732,846

15 Claims. (Cl. 260—449.6)

This invention relates to the synthesis of organic compounds. In one aspect this invention relates to the hydrogenation of an oxide of carbon in the presence of a finely divided entrained hydrogenating catalyst under conditions such that organic compounds having more than one carbon atom per molecule are produced. In another aspect this invention relates to a method and apparatus for the synthesis of organic compounds in a multiple stage process. This invention is applicable generally to the hydrogenation of organic compounds containing a carbonyl group and herein designated as carbon oxides.

It has recently been proposed in an application filed by Luther R. Hill and Henry G. McGrath, Serial No. 726,620, filed February 5, 1947, to effect the hydrogenation of carbon monoxide in the presence of a finely divided hydrogenation catalyst which is present in a gaseous reaction mixture in a much smaller amount than heretofore practiced. According to the Hill and McGrath application the reaction mixture comprising hydrogen and carbon monoxide and an entrained finely divided hydrogenating catalyst is passed upwardly through a reaction zone at velocities above about 6 feet per second and as high as 40 feet per second. In a process using such high velocities of the reaction mixture, the catalyst is entrained in the reaction mixture and passes through the reaction zone with the gases and does not form the conventional pseudoliquid catalyst phase characteristic of lower velocity systems. In such high velocity systems the residence time of the catalyst in the reaction zone is comparatively short with respect to conventional fluidized processes, and the rate of heat transfer between the reaction mixture and cooling fluids surrounding the reaction zone is much greater than that heretofore obtainable. The present invention consists of a modification of the above described process.

It is an object of this invention to provide a process and apparatus for the synthesis of organic compounds.

Another object of this invention is to provide a multi-stage process for the hydrogenation of carbon monoxide in the presence of finely divided entrained catalyst.

Still another object of this invention is to carry out the reaction between hydrogen and carbon monoxide at a substantially lower temperature than heretofore practiced.

A further object is to make operable the hydrogenation of carbon monoxide at lower recycle and/or $H_2$:CO ratios.

Various other objects and advantages will become apparent to those skilled in the art from the accompanying description and disclosure.

According to my invention, organic compounds are produced by the hydrogenation of carbon monoxide by continuously passing a mixture of hydrogen and carbon monoxide containing entrained or suspended finely divided catalyst, such as finely divided metallic iron, through a plurality of reaction zones under conditions such that the temperature of the first of said zones is substantially lower than the temperature of the last of said zones.

In a preferred embodiment of this invention, a gaseous mixture of hydrogen and carbon monoxide containing a finely divided hydrogenation catalyst comprising metallic iron is passed through two successive reaction zones. The linear velocity of the gas passing through the first of said two zones is at least 6 feet per second and preferably between about 8 and about 40 feet per second, and a temperature between 300° F. and about 600° F. is maintained in said first reaction zone. The gaseous effluent from said first reaction zone is passed to a second reaction zone of rising or higher temperature where the average temperature of the effluent in that zone is raised at least 25° F. to at least about 100° F. above the outlet temperature of said first reaction zone. An effluent is removed from the second of said reaction zones and organic compounds are removed therefrom as products of the process.

The mechanisms of the hydrogenation of carbon monoxide in the presence of a hydrogenation catalyst are not thoroughly understood; however, in general, at least the following three stages are, roughly, characteristic of the hydrogenation to produce organic compounds. The first stage is the sorption of carbon monoxide on the catalyst. The second stage is the hydrogenation of the sorbed carbon monoxide and the growth of carbon-carbon chains. The third and last stage is considered to be the stabilization and desorption of the resulting synthesized organic molecules from the catalyst. According to this invention, therefore, each of these stages are effected under its most favorable reaction conditions. To effect each of these three stages under their most favorable reaction conditions, the synthesis process is carried out in a series of successive reaction zones in which reaction zones one or more of the above stages is carried out under the most favorable reaction conditions. According to the preferred embodiment of this invention in which two reaction zones are used to effect the synthesis of organic compounds from hydrogen and carbon monoxide, the first two stages, i. e., the sorption of carbon monoxide on the catalyst and the hydrogenation of sorbed carbon monoxide and growth of carbon-carbon chains, are effected in the first reaction zone under their most favorable known conditions, such as temperature, pressure, etc. The third stage, which is the stabilization and desorption of the synthesized molecules is effected in the second or last reaction zone under conditions most favorable to that stage of the synthesis process.

Since relatively low temperatures are favorable for the first two stages of the synthesis process above described, the first reaction zone is maintained at a relatively low temperature, usually between 300° F. and 600° F., preferably when using a metallic iron catalyst between about 450° F. and about 600° F. by removing heat therefrom as by cooling with a liquid. This relatively low synthesis temperature has been shown to result in a longer active catalyst life, decreased carbon production, higher yields of oxygenated compounds, and higher average product molecular weight. Generally, the pressure in the first stage is less than 500 pounds per square inch gage and generally between about 80 pounds to about 400 pounds per square inch gage with an iron catalyst. The velocity in this first reaction zone should be at least 8 feet per second and as high as 40 feet per second to insure the continuous circulation of the catalyst through the first reaction zone and to prevent the formation of the conventional pseudo-liquid catalyst phase. At such velocities the catalyst concentration is usually less than 25 pounds per cubic foot of gas, and generally between about 1 pound and about 18 pounds per cubic foot of gas. The residence time of the reaction mixture or the contact time of the reactants with the catalyst in the first reaction zone should be sufficient for a substantial chain growth of the organic compounds. Usually less than about 5 to 7 seconds contact per pass of the gases with the catalyst in the first reaction zone is sufficient to produce the desired organic product; however, longer or shorter contact times may be used without departing from the scope of this invention. To conveniently maintain the high velocity in the first reaction zone, and to insure minimum temperatures therein, the cross-sectional area of any individual tube of the reaction zone is usually less than about 2.5 inches in diameter and may be as small as 1 inch in diameter or smaller. Such a relatively small diameter of any individual tube provides increased heat transfer surface for maintaining the temperature in the first reaction zone at the required level. The reaction zone may comprise a single or a plurality of parallel tubes in which hydrogenation is effected.

In the second reaction zone, in which the third stage constituting the stabilization and desorption of the synthesized molecules is effected, the temperature is maintained substantially higher than the temperature of the first reaction zone by maintaining the zone under adiabatic conditions or by adding heat thereto. Thus, preferably, the average temperature in the second reaction zone is at least 25° F. to at least 100° F. higher than the outlet temperature of the first reaction zone. Generally the temperature of the second reaction zone will be between about 600° F. and about 700° F. when using a metallic iron catalyst. As in the first reaction zone the pressure is maintained less than about 500 pounds per square inch gage, but, as lower pressures aid in the desorption of the synthesized molecules from the catalyst, partial pressures lower than the prevailing partial pressure in the first zone may be used in some instances, such as by decreasing the partial pressure of the products to be desorbed by injecting therein an inert gas, such as carbon dioxide or steam. The velocity of the gaseous mixture passing through the second reaction zone is usually substantially equivalent to or lower than the velocity of the gases passing through the first reaction zones.

In one modification of this invention the velocity of the gases in the second reaction zone is less than the velocity of the gases in the first reaction zone and less than 6 feet per second such that a pseudo-liquid dense phase of catalyst is formed in that zone. Such a decrease in velocity allows adequate time for the desorption of the synthesized organic molecules from the catalyst as a result of an increase in residence time of the catalyst itself in that zone. However, the length of the second reaction zone is preferably such that the residence time of the gaseous effluent from said first zone is as short as possible, preferably less than about 3 seconds.

The gas velocity in the second reaction zone may range from about 0.5 to about 40 feet per second without departing from the scope of this invention. When the gas velocity in the second reaction zone is substantially the same or within the range of the velocities in the first reaction zone, the concentration of catalyst in the gaseous mixture will also be similar. When the second zone is operated with a gas velocity below about 6 feet per second under conditions to form the conventional pseudo-liquid catalyst phase, the catalyst concentration will usually vary from about 35 pounds to about 120 pounds per cubic foot of gas and will depend to some extent upon the amount of carbon and wax deposition on the catalyst. In certain respects the second reaction zone may be considered as a catalyst regenerated or revivification zone as well as a part of the synthesis itself. In this zone much of the relatively high boiling products are removed from the catalyst at the temperatures and partial pressures existing therein.

The reaction effluent and catalyst are removed from the second reaction zone for separation. The catalyst is separated from gases in the conventional manner by settling and the like. The gaseous effluent substantially free of catalyst is then cooled and condensed for the recovery of organic compounds as products of the process.

In the conventional process in which all three stages of the synthesis are carried out in a single reaction zone, the temperature limitations are frequently dictated by the minimum temperature allowable in the third or desorption stage. In the present process in which the stages are operated in the respective reaction zones, the third stage does not dictate the lowest temperature for the first and second stages and therefore lower temperatures may be used for these two stages than possible with a single reaction zone. At the same time the effectiveness of high temperatures for the desorption of organic products from the catalyst may be retained by the use of a reaction zone for the third stage alone. Each stage of the synthesis process is carried out at its optimum temperature by using multiple reaction zones in the manner described.

In operating in accordance with this invention with an entrained catalyst for a continuous catalyst phase, a H₂:CO fresh feed ratio as low as 0.7:1 can be used with success. This mol ratio will vary from about 0.7:1 to about 1.5:1 and higher ratios may be used if desired.

The catalyst employed in the present invention is a finely divided powdered catalyst of a metal or metal oxide which is or becomes in the reaction zone a catalyst for the hydrogenation reaction. Finely divided metallic iron or iron oxides or a mixture thereof are an example of the catalyst employed in this invention. Other metals and metallic oxides which are effective in catalysing the hydrogenation of carbon monoxide, such as cobalt, nickel, and other metals of Group VIII of the periodic table may be employed. While the catalyst powder usually consists of such catalytic metals or their oxides, it may also include a minor amount of promoting ingredients, such as alkalis, alumina, silica, titania, thoria, manganese oxide, and magnesia. The catalyst may also be supported on a suitable support, such as a bentonite type clay, alumina, silica gell, "Super Filtrol," and mixtures of these supports. In the following description catalyst powders consisting of a metal or a metal oxide and containing at most a minor proportion of promoters are referred to as a "finely divided metal hydrogenation catalyst."

Preferably, the powdered catalyst initially contains no more than a minor proportion by weight of material whose particle diameter is greater than 250 microns. The greater proportion of the catalyst mass preferably comprises a material whose particle diameter is smaller than 100 microns including at least 25 per cent of a material having a particle size smaller than 40 microns. An example of a desirable powdered catalyst, especially when a pseudo-liquid catalyst phase is present in the second or last reaction zone, is one which comprises at least 75 per cent by weight of a material smaller than 150 microns at least 25 per cent by weight of a material smaller than 40 microns. The actual size distribution of the particles in the catalyst mass is not as important a factor with a relatively high velocity system as it is with a relatively low velocity system.

A fresh feed gas having a hydrogen to carbon monoxide ratio in the amount heretofore described is employed and the ratio of hydrogen to carbon monoxide in the reaction zone itself may be varied from these ratios to a desired value by recycling a portion of the unconverted reactants in the reaction effluent after removal of a part or all of the normal liquid product by condensation. A portion of the effluent after removal of the greater part of the liquid product is recycled to the reaction zone in a volumetric ratio of recycle to fresh feed gas of about 0.5:1 to about 10:1, preferably about 1:1 to about 3.5:1. Up to about 3.5:1 recycle ratio and with no preheating of the recycle gas substantially no preheating of the feed is necessary while at higher recycle ratios of 5 or 6:1 preheating of the feed is usually necessary. The ratio of hydrogen to carbon monoxide in the reaction zone itself is usually about 1:1 to about 3:1 and according to this process may be maintained at about 1:1 without detrimental effect on the synthesis reaction. For very low hydrogen to carbon monoxide fresh feed ratios of less than 0.9:1 the ratio in the reaction zone itself may be even less as a result of the consumption of hydrogen relative to carbon monoxide in a ratio greater than the feed ratio and because of recycling. Once through operations without recycle, although not generally used, are within the scope of this invention.

The linear velocity of the gaseous reaction mixture passing upwardly through the reaction zones is the linear velocity the fresh feed stream would assume if passed through the reactor in the absence of catalyst.

Although the invention has been described with reference to an upwardly flowing gaseous stream of reactants and catalyst, it should be understood that the catalyst and reactants may flow together downwardly, horizontally, or even angularly through a reaction zone without departing from the scope of this invention. The important requirements of this invention are that the catalyst be entrained in the synthesis gas or reaction mixture and passed through a plurality of reaction zones maintained under optimum reaction conditions characteristic of the reaction stage effected in the respective reaction zone. It has been found that, by upward flowing of gas through a substantially vertical reaction zone, the entrainment of the catalyst and the reaction time may be controlled conveniently and accurately and the tendency for segregation and stratification of catalyst is minimized.

The temperature requirement of the first reaction zone may be achieved conveniently by indirect heat exchange with a cooling medium surrounding the reaction zone, such as by cooling with liquid water or Dowtherm, by vaporization of a liquid surrounding the zone, or by direct injection of a gas or liquid into the zone.

Several methods may be used to achieve the desired temperature of reaction in the second or last reaction zone, and to maintain that temperature a substantial amount above the temperature of the first reaction zone. One of these methods comprises raising the temperature in the last reaction zone by means of the internal heat of reaction of the reactants. According to this method of controlling the temperature of the second or last reaction zone, the exothermic heat of reaction is not removed from the second reaction zone but it is retained therein which results in a continuous rise in temperature. In other words, a portion of the first and second stage reactions are carried out in the third stage under substantially adiabatic conditions. This is the least desirable of the various methods for controlling the temperature of the second or last reaction zone since it requires some first and second stage reactions to be carried out in the last reaction zone. However, it is the most desirable from the standpoint of apparatus simplicity because it is only necessary to follow the first reaction zone, which is usually externally cooled by indirect heat exchange with a cooling medium, with a shorter second reaction zone which may not be cooled in any manner. At least, the second reaction zone is not cooled to such an extent that the temperature is not allowed to rise to the desired value in that zone and above the outlet temperature of the first reaction zone.

A second method of controlling the temperature in the last reaction zone is by imparting heat to the reaction fluid from an external source. Various methods may be utilized to apply heat to the reaction gases in the last reaction zone with a heating medium. These methods comprise heating a liquid or gas and transferring sufficient sensible heat of the preheated liquid or gas to the gaseous mixture in the last reaction zone by indirect heat exchange to raise the temperature therein. Another method comprises introducing a gaseous mixture at a relatively high temperature directly into the gaseous mixture in the last reaction zone. Still another method is to allow condensation of a gas in indirect heat exchange with the last reaction zone to transfer latent heat to the reaction mixture which raises it to the desired temperature. A convenient method for heating the last reaction zone comprises introducing all or a portion of the recycle gas after preheating directly into the last reaction zone to raise the temperature therein. When the recycle gas is divided between the reaction zones, it is preferred to divide the recycle gas to the first and second zones in a ratio between about 0.5:1 and about 3:1, usually about 1:1. The various methods of heating the last reaction zone will be discussed in more detail in the description of the drawing.

The cross-sectional areas of the first and last reaction zones may vary to a considerable extent from each other. The cross-sectional area of the last reaction zone may be somewhat larger than the cross-sectional area of the first reaction zone to allow a lower velocity of gases in the last reaction zone, such as when a pseudo-liquid catalyst phase is present in the last zone.

Figure 2:
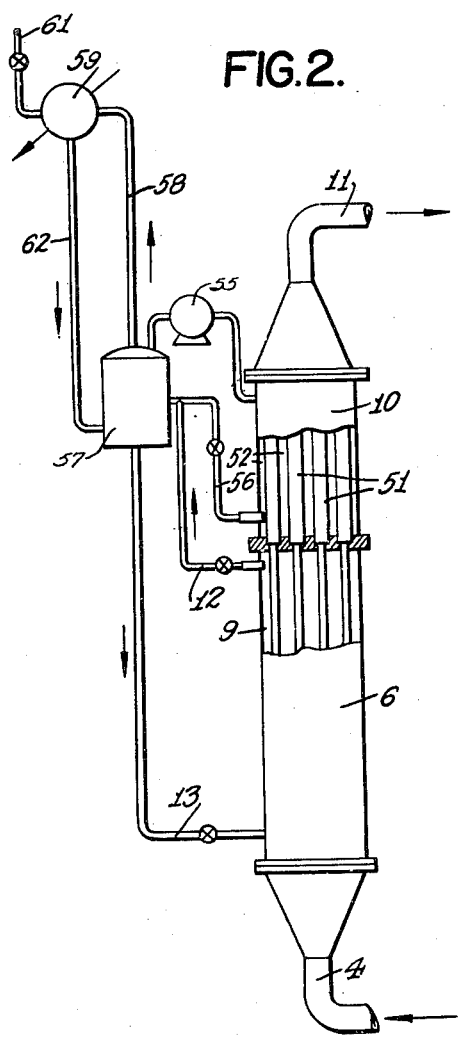

The invention will be discussed further by reference to the accompanying drawing which comprises views in elevation, partly in cross-section, of suitable apparatus for carrying out the process of the present invention. Fig. 1 of the drawing is an elevational view diagrammatically illustrating a plurality of reaction zones and suitable auxiliary equipment for carrying out an embodiment of the invention. Fig. 2 of the drawing is a modification of the reaction zone of Fig. 1 embodying the essential features of the present invention.

In Fig. 1 of the drawing a synthesis gas comprising hydrogen and carbon monoxide present in a ratio between about 0.7:1 and about 1.4:1 is obtained from any suitable source. For example, a suitable source of hydrogen and carbon monoxide is the conversion of steam, carbon dioxide, and methane in the presence of a catalyst, such as nickel. The resulting mixture of such a conversion usually contains sulphur and sulphur compounds and the gas is usually purified to remove such compounds. If a sulphur resistant catalyst is used, the purification step is unnecessary. After purification in conventional manner, known to those skilled in the art, the mixture of hydrogen and carbon monoxide is introduced into the lower end of a conduit 4, as shown, and passed upwardly through a plurality of reaction zones comprising a reaction zone 6 and a reaction zone 10. Reaction zone 6 comprises a bundle of tubes 7 enclosed by a shell to form an annular space 9 between the shell and tubes 7. The diameter of each of tubes 7 is usually less than about 2.5 inches, however, larger diameter tubes are within the scope of this invention. Gases pass upwardly through first or low temperature reaction zone 6 to a second or last reaction zone 10 of higher temperature. Reaction zone 10 may comprise a bundle of tubes surrounded by a shell similar to reaction zone 6 or it may simply comprise an enlarged cross-sectional conduit without the annular space, such as annular space 9 of reaction zone 6. The temperature of reaction zone 6 is maintained below about 600° F. and under other reaction conditions as previously described. The gaseous mixture passes through reaction zone 6 at a velocity of at least 8 feet per second and into reaction zone 10 which is maintained at a temperature at least about 25° F. to at least 100° F. above the outlet temperature of reaction zone 6. The linear gas velocity in reaction zone 10 may be the same as the velocity in the reaction zone 6 or the velocity may be somewhat less, even lower than 6 feet per second, to form a pseudo-liquid dense phase of catalyst therein.

The temperature of reaction in reaction zone 6 is maintained at the desired optimum by introducing a liquid or vapor cooling medium through conduit 12 into annular space 9 and removing it therefrom through conduit 13. Alternatively, conduit 13 may be closed and a liquid introduced into annular space 9 through conduit 12 and maintained under a pressure such that the liquid boils at the desired temperature. The vapors of the boiling liquid in annular space 9 are removed through conduit 12 and may be condensed and returned thereto.

The reaction effluent from reaction zone 10 is passed to a catalyst separation zone 16 through conduit 11. In separation zone 16 the velocity of the gases is decreased by the increased cross-sectional area of separation zone 16 to such an extent that substantially all of the catalyst separates by gravity from the reaction mixture and passes downwardly from the separation zone 16 into a stripping zone 34 to be discussed more fully hereinafter.

Vaporous reaction effluent containing a small amount of entrained catalyst fines is passed from separation zone 16 to cyclone separator 17 in which catalyst fines are separated from the effluent. The separated fines are passed from cyclone separator 17 through conduit 33 to the lower portion of separation zone 16 to be combined with the other catalyst separated in zone 16. The reaction effluent substantially free from catalyst particles is passed through conduit 18, through an oil scrubber (not shown) to remove any entrained catalyst, through condenser 19, and finally to accumulator 21 in which a liquid phase is formed. Condenser 19 may comprise a single or a series of condensers or heat exchangers and is maintained at about 150° F. and under the pressure prevailing in the last reaction zone. The liquid condensate, which is at a temperature of about 150° F. or higher in accumulator 21, is withdrawn from accumulator 21 through conduit 22 and is passed to suitable separating and purification means (not shown) for the separation and purification of organic products of the process, such as hydrocarbons and oxygenated organic compounds.

According to a modification of this invention, reaction zone 10 is heated by passing uncondensed vapors by means of a compressor (not shown) from accumulator 21 through conduits 23, 24, and 26, heater 27, conduits 29 and 31 to reaction zone 10. The uncondensed vapors comprising unreacted hydrogen and/or carbon monoxide, carbon dioxide and relatively low boiling hydrocarbons, such as methane, propane, etc., are heated in heater 27 to a sufficiently high temperature so that, when they are either introduced directly into the reaction mixture in zone 10 as is preferred or indirectly heat exchanged with the reaction mixture in zone 10, the temperature of that zone is maintained above the temperature of reaction of zone 6. The introduction of the recycle gas directly into reaction zone 10 strips relatively high boiling organic compounds from the catalyst by raising the temperature of reaction zone 10 by virtue of the sensible heat of the recycle gas and by lowering the partial pressure of these organic compounds. Some reaction may take place between the hydrogen, carbon monoxide and any low boiling unsaturated organic compounds contained in the uncondensed gases. In many instances it will be undesirable to introduce all of the recycle gas into reaction zone 10 through conduit 31 and for this reason a portion of the recycle gas is passed by means of a compressor (not shown) through conduit 29 to the lower portion of conduit 4, as shown. All of the recycle may be passed through line 29 to conduit 4, if desired, without departing from the scope of this invention. A portion of the reaction effluent prior to condensation may be introduced into reaction zone 10 through conduits 32 and 26, heater 27, conduits 29 and 31. In many instances it will be unnecessary when passing a portion of the reaction effluent to reaction zone 10 to heat this entire portion and, therefore, part of the recycle reaction effluent may by-pass heater 27 by means of conduit 28. A portion of the reaction effluent recycle from conduit 32 may be combined with the recycle gases from line 24, if desired.

All or a portion of the uncondensed vapors from accumulator 21 may be removed from the system through line 23 and passed to a recovery system (not shown) for the recovery of hydrocarbons and oxygenated organic compounds therefrom as products of the process.

The separated catalyst passed from separation zone 16 to stripping zone 34 is deflected by baffles 36 and further stripped of relatively high boiling hydrocarbons and waxes by an upward flowing gas, such as hydrogen, steam, recycle gas, etc., introduced into stripping zone 34 through conduit 37. The stripped catalyst is passed from stripping zone 34 into a standpipe 38 from which the catalyst is passed through a valve 41 to conduit 4. Valve 41 may be used to regulate the circulation of catalyst. An aeration gas, such as hydrogen, recycle gas, or fresh feed gas, may be introduced into standpipe 38 through inlet conduit 39. The weight of the catalyst in standpipe 38 forces the catalyst into conduit 4 without the use of other mechanical means when the pressure in separating zone 16 and reaction zone 10 is approximately the same as the pressure in reaction zone 6. The pressure head in standpipe 38, which forces the catalyst to flow, is obtained by virtue of the difference in densities in the reaction zone and the standpipe.

When the apparatus of Fig. 1 is operated such that the heat supplied to reaction zone 10 is obtained from the sensible heat of the reaction effluent from reaction zone 6 and from exothermic heat from a portion of first stage and second stage reactions effected therein without the application of external heat, reaction zone 10 is heavily lagged or lined with insulation material, such as abestos, in order to retain the heat in zone 10 and to afford a substantially adiabatic system therein.

Fig. 2 of the drawing is another arrangement of apparatus comprising multiple stage reaction zones similar to Fig. 1 and will be discussed only briefly. The synthesis gas comprising hydrogen and carbon monoxide and containing entrained catalyst passes through conduit 4 into tubes 7 of reaction zone 6 and thence into reaction zone 10. Reaction zone 6 is constructed similarly to the corresponding reaction zone in Fig. 1. Reaction zone 10 of Fig. 2 corresponds to reaction zone 10 of Fig. 1 except it contains a bundle of tubes 51 through which the reaction effluent from reaction zone 10 passes. The outer shell of reaction zone 10 forms an annular space 52 surrounding tubes 51. The reaction effluent is removed from reaction zone 10 through conduit 11 and passes to subsequent equipment previously described in connection with Fig. 1 for separation of catalyst and products of the process. In the modification of the apparatus shown in Fig. 2 liquid Dowtherm is passed from accumulator 57 through conduit 13 into annular space 9 of reaction zone 6. The pressure on the annular space 9 of reaction zone 6 is such that the Dowtherm boils below the desired reaction temperature in that zone whereby the temperature of reaction is maintained at the optimum by removing the exothermic heat of reaction as latent heat of vaporization of the Dowtherm liquid. Dowtherm vapor and liquid from annular space 9 is removed therefrom through conduit 12 and passed to an accumulator 57. Dowtherm vapor from accumulator 57 is passed to annular space 52 through conduit 54 by means of a suitable low head compressor 55. Vapors in conduit 54 may be preheated by means not shown prior to introduction into annular space 52. In annular space 52 of reaction zone 10, Dowtherm vapor at a higher temperature and pressure than it was in annular space 9, gives up its sensible and latent heat to the reaction effluent in tubes 51 and is condensed therein. Condensed liquid and any uncondensed vapor are passed from annular space 52 through a conduit 56 back to accumulator 57. In accumulator 57 the pressure is equalized. Any vapors formed by the equalization of pressure and excess vapors from annular space 9 are passed overhead from accumulator 57 through a conduit 58 to a condenser or waste heat boiler 59 in which the vapors are cooled and condensed. Any uncondensed gases are removed from the system through a conduit 61. Condensate from condenser or boiler 59 is returned through a conduit 62 to accumulator 57 for recirculation.

Since a somewhat lower velocity may be maintained in reaction zone 10 than in reaction zone 6, tubes 51 are constructed of a larger diameter than tubes 7, as shown. Reaction zone 10 may be heated or maintained at the desired temperature in a similar manner as reaction zone 6, that is, by maintaining a suitable heating liquid under pressure at which it boils at the desired temperature. The vapors then are removed from annular space 52, condensed and returned thereto. In this manner several successive reaction zones may be maintained at their desired temperature by using Dowtherm under successively greater pressures in each reaction zone such that the temperature in each reaction zone is maintained at the desired value. Various other modifications of cooling and heating the various reaction zones of this invention may be practiced without departing from the scope of this invention.

Certain valves, coolers, heaters, pumps, etc. have been omitted as a matter of convenience and their use and location will become obvious to those skilled in the art. The size and length of certain conduits of Figures 1 and 2 of the drawing are not proportional to the amount of fluid passing therethrough and the distance travelled but are merely diagrammatical. It is not intended to limit any particular location of inlets and outlets as shown in the drawing, for example recycle may be introduced through conduit 29 into conduit 4 before or after the introduction of catalyst therein without departing from the scope of this invention. The example and theory in connection with this invention are offered as illustration and should not be construed to be unnecessarily limiting.

Example

The following example illustrates a commercial application of the present invention to the hydrogenation of carbon monoxide to produce hydrocarbons having more than one carbon atom per molecule and oxygenated organic compounds. The production of such organic compounds is effected in two successive reaction zones through which a gaseous reaction mixture containing an entrained finely divided iron catalyst flows. Fresh feed is introduced into the first of the two reaction zones and passes upwardly therethrough. The first and second stage reactions heretofore described are effected in this first reaction zone. The effluent from the first reaction zone passes upwardly through the second reaction zone in which the so-called third stage reaction is effected. Catalyst and gaseous components are removed together from the upper portion of the second reaction zone for the separation and recovery of catalyst and products.

The fresh feed rate is about 2,920,000 standard cubic feet per hour (S. C. F./hr.) of synthesis gas having a 1.4:1 $H_2$:CO ratio and an approximate composition as follows:

| Components: | Mol per cent |
|---|---|
| $N_2$ | 1.1 |
| $H_2$ | 52.7 |
| CO | 37.6 |
| $CO_2$ | 6.9 |
| $CH_4$ | 1.0 |
| $H_2O$ | 0.7 |
| | 100.0 |

The synthesis pressure is approximately 250 pounds per square inch gage in both reaction zones and the average temperatures in the first and second reaction zones are about 575° F. and 625° F., respectively. About 40 per cent of the heat necessary to maintain this temperature differential is adiabatic reaction heat and the remainder is obtained by injecting heated recycle gas. Circulated catalyst is stripped with hot recycle gas which further raises the catalyst temperature to 630° F.

The catalyst circulation is approximately 2,000,000 pounds per hour, sufficient to provide a net catalyst loading in the transfer line of approximately 3.5 pounds per cubic foot of gas at flowing conditions. The composition of the circulated catalyst is approximately as follows:

| Component: | Weight per cent |
|---|---|
| Oil and wax | 7.4 |
| Carbon | 26.8 |
| Total iron | 58.8 |
| Oxygen (by difference) | 7.0 |
| | 100.0 |

In addition to the above constituents the catalyst also contains minor percentages of promoting and stabilizing agents. The oxygen is assumed to be in the form of ferrous oxide.

The reactor effluent is cooled to about 400° F. and purified of entrained catalyst by an oil scrubbing operation after which the uncondensed vapor is further cooled to about 150° F. At this point a recycle gas stream is segregated from the net gas, oil, and aqueous product streams. This recycle gas amounts to 5,140,000 S. C. F./hr. and has the following approximate composition:

| Component: | Mol per cent |
|---|---|
| $CH_4$ | 6.8 |
| $C_2H_4$ | 2.5 |
| $C_2H_6$ | 1.1 |
| $C_3H_6$ | 2.2 |
| $C_3H_8$ | 0.3 |
| $C_4H_8$ | 1.2 |
| $C_4H_{10}$ | 0.1 |
| $C_5$ | 1.0 |
| $C_6+$ | 1.0 |
| Total hydrocarbons | 16.2 |
| $N_2$ | 2.6 |
| $H_2$ | 30.4 |
| CO | 8.8 |
| $CO_2$ | 39.6 |
| $H_2O$ | 1.4 |
| Oxygenated Compounds | 1.0 |
| Total | 100.0 |

The disposition of the recycle gas is as follows:

| | S. C. F./hr. |
|---|---|
| (a) To first reaction zone (mixed with synthesis gas) | 2,060,000 |
| (b) To second reaction zone (heated to 840° F.) | 2,400,000 |
| (c) To stripper (heated to 840° F.) | 680,000 |

A two-stage centrifugal compressor is used to supply pressure head for overcoming friction in the recycle circuit. The part which is mixed with the synthesis gas (stream a) is withdrawn at the interstage of the recycle compressor because it requires less pressure than the remainder, which goes through a fired furnace.

The gas for recycling to the second reaction zone and to the stripper is heated to about 840° F. in a furnace which has a duty of 61,500,000 B. t. u./hr. Compared with a synthesis system in which recycle gas is not heated, this duty is recovered as additional steam generation from the cooling surface surrounding the first reaction zone.

The first reaction zone comprises 1050 steel tubes 2.0″ O.D. x 36′-0″x⅛″ average wall. The inlet velocity is approximately 9 feet per second and the outlet velocity somewhat less because of the volume decrease in the course of the reaction. The residence time for gases and vapors in this zone is about 5 seconds, and for catalyst a little longer than 5 seconds because of slippage. Although the net catalyst loading is about 3.5 pounds per cubic foot, the combined effects of volume shrinkage and slip cause the average actual fluid density to fall in the range of approximately 7 to 10 pounds per cubic foot at flowing conditions.

A heat quantity of approximately 106,500,000 B. t. u./hr. is removed from the first reaction zone in order to maintain the desired low average temperature. This is accomplished by generating 120,000 pounds per hour of steam at 300 pounds per square inch gage pressure in contact with the outside surface of the tubular elements.

The second, or high temperature, reaction zone comprises essentially only the volume of the overhead conduit from the first zone to a disengaging vessel, which conduit is sufficient in length and diameter to afford a contact time of about 1 second. Although it would be preferable to avoid carbon monoxide conversion in the second zone, under the conditions specified roughly 10 per cent of the total reaction heat will be liberated in this zone.

The reaction effluent is passed to conventional recovery units for recovery and separation of organic products of the process. The table below indicates the approximate recovery of organic compounds from the synthesis process on the basis of barrels per stream day.

TABLE

*Recovered products from synthesis reactor*

| | B.P.S.D. |
|---|---|
| Propylenes | 290 |
| Butylenes | 230 |
| Equivalent to catalytic polymers by conversion of propylenes and butylenes | 375 |
| 400° E. P. gasoline | 730 |
| 650° E. P. Diesel blending stock | 155 |
| Waxy bottoms | 18 |
| Oxygenated compounds, (7,350 lb./hr.) | 610 |

Having described my invention, I claim:

1. A process for hydrogenating carbon monoxide to produce organic compounds having more than one carbon atom per molecule which comprises passing a gaseous mixture comprising hydrogen and carbon monoxide upwardly through a plurality of elongated successive reaction zones, entraining in said gaseous mixture a finely divided metal hydrogenation catalyst comprising iron in an amount between about 1 and about 18 pounds per cubic foot of gas, maintaining the velocity of said upwardly flowing gaseous mixture greater than about 6 feet per second under conditions such that a dense pseudo-liquid phase of catalyst is not formed and such that the finely divided catalyst continuously moves in the direction of flow of the gases in said plurality of reaction zones, maintaining the outlet temperature in the first of said plurality of reaction zones between about 450 and about 600° F., maintaining an average temperature in the last of said plurality of reaction zones between about 600° F. and about 700° F. and at least 25 degrees above the outlet temperature in the first of said plurality of reaction zones, maintaining a pressure between about 80 and about 500 pounds per square inch gage in said plurality of reaction zones, continuously withdrawing from the upper portion of the last of said plurality of reaction zones an effluent comprising organic compounds and entrained catalyst, separating entrained catalyst from said effluent, recycling the separated catalyst, and recovering organic compounds from said effluent as products of the process.

2. A process for hydrogenating carbon monoxide in the presence of a finely divided catalyst to produce organic compounds having more than one carbon atom per molecule which comprises passing a fluid mixture comprising hydrogen and carbon monoxide in a feed ratio between about 0.7:1 and about 1.5:1 containing entrained finely divided metal hydrogenation catalyst comprising iron through a plurality of successive reaction zones under conditions such that organic compounds are produced, maintaining in the first of said plurality of reaction zones a linear velocity between about 8 and about 40 feet per second, a concentration of catalyst between about 1 and about 25 pounds per cubic foot of gas and an outlet temperature below about 600° F., maintaining in the last reaction zone a linear velocity below about 6 feet per second and a concentration of catalyst between about 35 pounds and about 120 pounds per cubic foot of gas, raising the average temperature in said last reaction zone to a value substantially above the outlet temperature of said first reaction zone, maintaining a pressure on said plurality of reaction zones below about 500 pounds per square inch gage, removing an effluent containing organic products of the process from the said last reaction zone, and separating organic products of the process from said effluent.

3. A process for hydrogenating carbon monoxide to produce organic compounds having more than one carbon atom per molecule which comprises passing a gaseous mixture comprising hydrogen and carbon monoxide upwardly through a plurality of successive reaction zones under conditions such that organic compounds are produced, entraining in said gaseous mixture a finely divided metal hydrogenation catalyst in an amount between about 1 and about 18 pounds per cubic foot of gas, maintaining the velocity of said upwardly flowing gaseous mixture greater than about 6 feet per second under conditions such that a dense pseudo-liquid phase of catalyst is not formed and such that finely divided catalyst continuously moves in the direction of flow of the gases in said plurality of reaction zones, cooling the first of said plurality of reaction zones such that the outlet temperature is below about 600° F., maintaining the last of said plurality of reaction zones under substantially adiabatic conditions such that the average temperature thereof is at least 25 degrees above the outlet temperature in the first of said plurality of reaction zones, maintaining a pressure below about 500 pounds per square inch gage in said plurality of reaction zones, continuously withdrawing from the last of said plurality of reaction zones an effluent comprising organic compounds and entrained catalyst, separating entrained catalyst from said effluent, recycling the separated catalyst, and recovering organic compounds from said effluent as products of the process.

4. A process for hydrogenating carbon monoxide to produce organic compounds having more than one carbon atom per molecule which comprises passing a gaseous mixture comprising hydrogen and carbon monoxide upwardly through a plurality of successive reaction zones under conditions such that organic compounds are produced, entraining in said gaseous mixture a finely divided metal hydrogenation catalyst, maintaining the velocity of said upwardly flowing gaseous mixture such that a dense pseudo-liquid phase of catalyst is not formed and such that finely divided catalyst continuously moves in the direction of flow of gases in said plurality of reaction zones, cooling the first of said plurality of reaction zones such that the outlet temperature is below about 600° F., maintaining the last of said plurality of reaction zones under substantially adiabatic conditions such that the average temperature thereof is at least 25 degrees above the outlet temperature in the first of said plurality of reaction zones, continuously withdrawing from the upper portion of the last of said plurality of reaction zones an effluent comprising organic compounds and entrained catalyst, separating entrained catalyst from said effluent, recycling the separated catalyst, and recovering organic compounds from said effluent as products of the process.

5. A process for hydrogenating carbon monoxide in the presence of a finely divided catalyst to produce organic compounds having more than one carbon atom per molecule which comprises passing a gaseous mixture comprising hydrogen and carbon monoxide in a feed ratio between about 0.7:1 and about 1.5:1 containing entrained finely divided metal hydrogenation catalyst comprising iron upwardly through two successive reaction zones at a velocity greater than about 6 feet per second under conditions such that the concentration of catalyst is between about 1 and about 25 pounds per cubic foot of gas and organic compounds are produced, cooling the first reaction zone sufficiently to maintain the outlet temperature thereof below about 600° F., maintaining the pressure in said reaction zones below about 500 pounds per square inch gage, removing an effluent containing organic compounds and catalyst from said second reaction zone, separating catalyst from said effluent and recycling same to said gaseous feed mixture, cooling and condensing said effluent to separate normally liquid products therefrom and recycling uncondensed vapors of said effluent to the lower portion of said second reaction zone, said recycled uncondensed vapors being heated to such an extent prior to introduction into said second reaction zone that the average temperature of said second reaction zone is increased at least 25 degrees above the outlet temperature of said first reaction zone.

6. A process for hydrogenating carbon monoxide in the presence of finely divided catalyst to produce organic compounds having more than one carbon atom per molecule which comprises passing a fluid mixture comprising hydrogen and carbon monoxide containing entrained finely divided hydrogenation catalyst comprising iron upwardly through two successive reaction zones at a velocity greater than about 6 feet per second under conditions such that the concentration of catalyst is between about 1 and about 25 pounds per cubic foot of gas and organic compounds are produced, vaporizing a liquid by indirect heat exchange with said first reaction zone under conditions such that the outlet temperature of said first reaction zone is maintained below about 600° F., compressing and subsequently condensing the vapors produced by indirect heat exchange with said first reaction zone by indirect heat exchange with said second reaction zone under conditions such that the average temperature therein is at least 25 degrees above the outlet temperature of said first reaction zone, passing condensate from said second reaction zone in indirect heat exchange with said first reaction zone, removing an effluent from the upper portion of said second reaction zone, and separating catalyst and organic products of the process therefrom.

7. Apparatus for the synthesis of organic compounds by the hydrogenation of carbon monoxide in the presence of a fluidized finely divided metal hydrogenation catalyst which comprises in combination two interconnected successive reaction chambers, a first conduit communicating with the lower portion of the first of said reaction chambers, a catalyst separation chamber in which catalyst is separated from a gaseous effluent, a second conduit communicating between the upper portion of the second reaction chamber and said catalyst separation chamber, a standpipe communicating between said catalyst separation chamber and said first conduit, a condenser, an accumulator, means for passing a gaseous effluent from said catalyst separation chamber through said condenser to said accumulator, a branched conduit communicating between said accumulator and said second reaction chamber and said first conduit, and means for heating said branched conduit.

8. Apparatus for the synthesis of organic compounds by hydrogenation of carbon monoxide in the presence of a fluidized finely divided metal hydrogenation catalyst which comprises in combination two successive interconnected reaction chambers, means for introducing a gaseous mixture into the lower portion of said first reaction chamber, means for removing a gaseous effluent from the upper portion of said second reaction chamber, means for separating finely divided catalyst from an effluent from said second reaction chamber, means for recycling said separated catalyst to first reaction chamber, a first heat exchange means for indirect heat exchange between a fluid and the reaction mixture in said first reaction chamber, a second heat exchange means for indirect heat exchange between a fluid and the reaction mixture in said second reaction chamber, an accumulator, two conduits communicating between said accumulator and the upper and lower portions of said first heat exchange means, two conduits communicating between said accumulator and the upper and lower portions of said second heat exchange means, one of the aforesaid conduits having a compressor therein for the transfer of vapors from said accumulator to said second heat exchange means, a condenser, means for passing vapors from said accumulator to said condenser, and means for passing condensate from said condenser to said accumulator.

9. A process for hydrogenating a carbon oxide in the presence of a finely divided catalyst to produce organic compounds which comprises passing a fluid mixture comprising hydrogen and a carbon oxide containing entrained finely divided metal hydrogenation catalyst through a plurality of successive reaction zones under conditions such that organic compounds are produced, maintaining in the first of said plurality of reaction zones a linear gas velocity sufficiently high such that the finely divided catalyst does not form a dense pseudo-liquid phase and is continuously moved in the direction of flow of the gases therethrough, maintaining in the last reaction zone a linear gas velocity sufficiently low such that a pseudo-liquid dense phase of catalyst is formed therein, maintaining the average temperature in said last reaction zone at a value substantially above the outlet temperature of said first reaction zone, removing an effluent containing organic products of the process from said last reaction zone, and separating organic products of the process from said effluent.

10. A process for hydrogenating a carbon oxide in the presence of a finely divided catalyst to produce organic compounds which comprises passing a gaseous mixture comprising hydrogen and a carbon oxide containing entrained finely divided metal hydrogenation catalyst through two successive reaction zones under conditions such that organic compounds are produced and at a sufficiently high linear gas velocity such that a pseudo-liquid dense phase of catalyst is not formed, cooling the first reaction zone, removing an effluent containing organic compounds and catalyst from said second reaction zone, separating catalyst from said effluent and recycling same to said first reaction zone, cooling and condensing said effluent to separate normally liquid products therefrom and recycling uncondensed vapors of said effluent to said second reaction zone, said recycled uncondensed vapors being heated to such an extent prior to introduction into said second reaction zone that the average temperature of said second reaction zone is increased at least 25° F. above the outlet temperature of said first reaction zone.

11. A process for hydrogenating a carbon oxide in the presence of a finely divided catalyst to produce organic compounds having more than one carbon atom per molecule which comprises passing a fluid mixture comprising hydrogen and a carbon oxide containing entrained finely divided hydrogenation catalysts through two successive reaction zones under conditions such that organic compounds are produced and at a linear velocity sufficiently high to prevent the formation of a dense pseudo-liquid phase of catalyst therein, vaporizing a liquid by indirect heat exchange with said first reaction zone, compressing and subsequently condensing the vapors produced by indirect heat exchange with said first reaction zone by indirect heat exchange with said second reaction zone under conditions such that the average temperature therein is at least 25° F. above the outlet temperature of said first reaction zone, passing condensate from said second reaction zone in indirect heat exchange with said first reaction zone, and removing from said second reaction zone an effluent comprising organic compounds as products of the process.

12. Apparatus for the synthesis of organic compounds by the hydrogenation of carbon oxide in the presence of a fluidized finely divided metal hydrogenation catalyst which comprises in combination two successive interconnected reaction chambers, means for introducing a gaseous mixture into the first of said reaction chambers, means for removing a gaseous effluent from the second of said reaction chambers, a first heat exchange means for indirect heat exchange between a fluid and the reaction mixture in said first reaction chamber, a second heat exchange means for indirect heat exchange between the fluid and the second reaction chamber, an accumulator, two conduits communicating between said accumulator and the upper and lower portions of said first heat exchange means, two conduits communicating between said accumulator and the upper and lower portions of said second heat exchange means, a condenser, means for passing vapors from said accumulator to said condenser, and means for passing condensate from said condenser to said accumulator.

13. A process for hydrogenating a carbon oxide in the presence of a finely divided metal hydrogenation catalyst to produce organic compounds which comprises passing a gaseous mixture of hydrogen and a carbon oxide containing entrained finely divided catalyst therein through a plurality of successive reaction zones under conditions such that organic compounds are produced, maintaining the velocity of gases passing through the first reaction zone sufficiently high such that a pseudo-liquid dense phase of catalyst is not formed and such that catalyst continuously moves in the direction of flow of the gases therethrough, and maintaining in one of said reaction zones subsequent to said first reaction zone an average temperature at least 25° F. above the outlet temperature of said first reaction zone and a partial pressure of the organic products produced substantially lower than in said first reaction zone.

14. A process for hydrogenating a carbon oxide in the presence of a finely-divided catalyst to produce organic compounds which comprises passing a gaseous mixture comprising hydrogen and a carbon oxide containing finely-divided hydrogenation catalyst through a plurality of successive reaction zones under conditions such that organic compounds are produced and at a sufficiently high linear gas velocity such that a pseudo-liquid dense phase of catalyst is not formed, removing an effluent containing organic compounds and finely-divided catalyst from the last reaction zone, recycling a portion of said effluent to the last reaction zone, said recycled portion of the effluent being heated to such an extent prior to introduction into said last reaction zone that the average temperature of said last reaction zone is at a value substantially above the outlet temperature of the prior reaction zone, and separating catalyst from said effluent and recycling same to the first reaction zone.

15. Apparatus for the synthesis of organic compounds by the hydrogenation of a carbon oxide in the presence of a finely-divided metal hydrogenation catalyst which comprises in combination a plurality of interconnected successive reaction chambers, a first conduit communicating with the first of said reaction chambers, a catalyst separation chamber in which catalyst is separated from vapors, means for passing a vaporous effluent containing finely-divided catalyst from the last of said reaction chambers to said catalyst separation chamber, means for passing separated catalyst from said separation chamber to said first conduit communicating with said first reaction chamber, a condenser, means for passing a vaporous effluent from said catalyst separation chamber to said condenser, a branched conduit communicating between said condenser and said last reaction chamber and said first conduit communicating with said first reaction chamber, and means for heating said branched conduit.

NORMAN L. DICKINSON.

REFERENCES CITED

The following references are of record in the file of this patent:

UNITED STATES PATENTS

| Number | Name | Date |
|---|---|---|
| 2,161,677 | Houdry | June 6, 1939 |
| 2,194,186 | Pier et al. | Mar. 19, 1940 |
| 2,231,493 | Cummings | Feb. 11, 1941 |
| 2,266,161 | Campbell | Dec. 16, 1941 |
| 2,276,274 | Keith, Jr. | Mar. 17, 1942 |
| 2,360,787 | Murphree et al. | Oct. 17, 1944 |